Figure 1:
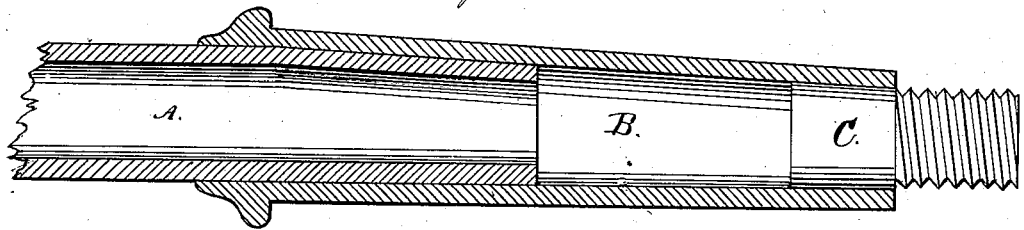

*Improved Wagon Axle*
invented by
William A. Lewis of Joliet, Will County Illinois

108609

PATENTED OCT 25 1870

Witnesses
Thos H Hitchins
Thomas ...

Inventor
William A. Lewis

UNITED STATES PATENT OFFICE.

WILLIAM A. LEWIS, OF JOLIET, ILLINOIS.

IMPROVEMENT IN WAGON-AXLES.

Specification forming part of Letters Patent No. 108,609, dated October 25, 1870.

*To all whom it may concern:*

Be it known that I, WILLIAM A. LEWIS, of Joliet, in Will county, and State of Illinois, have invented a new and useful Improvement on Wagon-Axles; and I do hereby declare the following to be a full, clear, and exact description of the same, reference being had to the annexed drawing, making a part of this specification, in which the figure is a longitudinal sectional view of the same.

The invention relates to the construction of that class of wagon-axles denominated "tubular axles," which I will proceed to explain.

A is a tubular axle, with the end which passes into the spindle tapered, as shown, onto and over the end of which is driven the hollow spindle or skein B, which may be fastened permanently by bolts, or may be shrunk on while hot. This skein or spindle B may be constructed of any suitable metal. It also has a plug welded or otherwise fastened into the end, as shown, for the nut which holds the wheel on.

The necessary pitch and gather is given to the spindle B by bending the axle at or near the inner end of said spindle in any degree it may be desired.

Having thus described my invention, what I claim as new, and desire to secure by Letters Patent, is as follows:

The combination of the hollow tapered spindle B and plug C with the hollow tapered axle A, bent to give the necessary pitch and gather to the spindle B, constructed and arranged as and for the purposes set forth.

W. A. LEWIS.

Witnesses:
    THOMAS C. CONNOLLY,
    F. A. LEHMANN.